Dec. 21, 1943.  J. A. NUMERO ET AL  2,337,164
MEANS FOR AUTOMATICALLY STARTING AND STOPPING GAS ENGINES
Original Filed Nov. 16, 1939   2 Sheets-Sheet 2

JOSEPH A. NUMERO
FREDERICK M. JONES

Patented Dec. 21, 1943

2,337,164

UNITED STATES PATENT OFFICE

2,337,164

MEANS FOR AUTOMATICALLY STARTING AND STOPPING GAS ENGINES

Joseph A. Numero and Frederick M. Jones, Minneapolis, Minn., assignors to U. S. Thermo Control Company, a partnership composed of Joseph A. Numero and M. Green Original application November 16, 1939, Serial No. 304,796. Divided and this application December 7, 1942, Serial No. 468,325

6 Claims. (Cl. 290—2)

This application relates to means for automatically starting and stopping a gas engine, and has for its object to control the starting and stopping of a gas engine which is a power means for controlling conditions within chambers or the like, such, for example, as means for controlling the temperature within a chamber generally referred to as air-conditioning.

In arrangements for conditioning where the parts are stationary or there is large room and availability of sufficient electrical current, it is generally customary to furnish the power from an electric motor or motors. The starting and stopping of electric motors is a simple matter requiring merely the closing and breaking of the line circuit through suitable switching means. Starting and stopping a gas engine in response to changes in the condition to be controlled involve serious difficulties and uncertainties which have caused it to be regarded as impractical to use a gas engine for such purposes. Yet in many types of industries, such, for example, as the trucking industry, where space is limited and electric current is unavailable, there is a substantial need for a satisfactory means for starting and stopping a gas engine through changes in the condition controlled by the power furnished by the gas engine.

Among these problems are the necessity of using a battery which at the same time furnishes the current for the spark of the gas engine and also receives current from the generator operated by the gas engine. The starter also must be operated by the current from the battery, and in practice the starter itself becomes a generator when the gas engine is operating. Then in order to insure certain and immediate starting there is need to use what is called a choke, and yet the choke should be thrown out of operation immediately after the gas engine is started. All of these instrumentalities must be so related that their control to effect starting and stopping by changes of the condition to be controlled shall be quick and certain.

It is a principal object of our invention therefore to arrange our battery, starter-generator, condition-controlled circuit make-and-break device, and a circuit including the make-and-break device and a master relay, so related that when, for example, a circuit is closed by a change of condition to be controlled, as by a change of temperature, the relay will close a circuit through the battery and to the starter-generator, bringing about the starting of the motor, and that thereafter the master relay contacts may serve as a conduit of generated electricity back to the battery.

It is a further object of our invention to arrange the circuits, relays, battery and make-and-break device in combination with a separate circuit closed by a relay adapted to be operated only by heavy battery current and to become inoperative when subject to the lighter generated current, in combination with a choke which is operated when the last-named circuit is closed and becomes inoperative when the relay current changes from heavy battery current to generated current.

It is a further object of our invention to provide a master relay for closing or breaking the main battery circuit to starter-generator, in combination with a secondary circuit having battery connection and which will be opened and closed by the changing of the condition to be controlled and which is adapted to energize the master relay to effect connection of the battery with the starter-generator for starting the gas engine.

It is a further object of our invention to provide in connection with the master relay a secondary relay having very few heavy windings which in turn go to the master relay in combination with a choke operating relay so that when strong current from the battery goes through to the starter-generator for starting the motor this current running over a few windings will energize the secondary relay to close the circuit through the choke relay and operate the choke, but when a weaker generator current passes back through the heavy wire over the few coils of the master relay it will be insufficient to energize the secondary relay and the choke relay will become deenergized and the choking action brought to an end.

This application is a division of our application Serial Number 304,796, filed November 16, 1939, Patent No. 2,303,857, granted December 1, 1942.

The full objects and advantages of our invention will appear in connection with the description given in detail in the following specification, and the novel features of the invention by which the aforesaid advantageous results are obtained will be particularly pointed out in the claims.

In the drawings illustrating an application of our invention in one of its forms—

Fig. 1 is substantially a reproduction of Fig. 16 of our aforesaid application.

Fig. 2 is identical with Fig. 18 of the aforesaid application.

Figure 1:
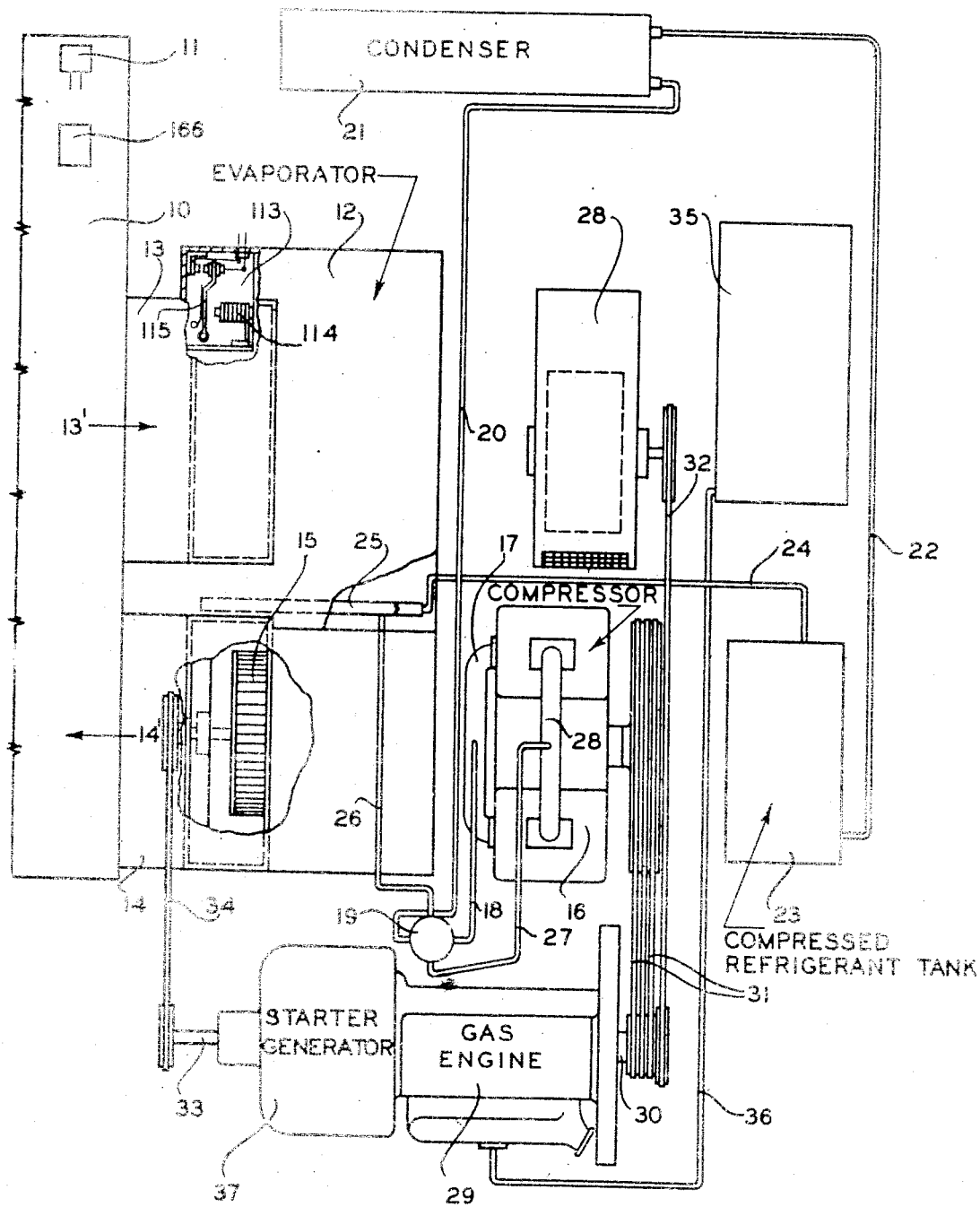
Fig. 1 is a schematic view in plan showing diagrammatically the various instrumentalities for air conditioning a compartment and their relation one to the other.
Figure 2:
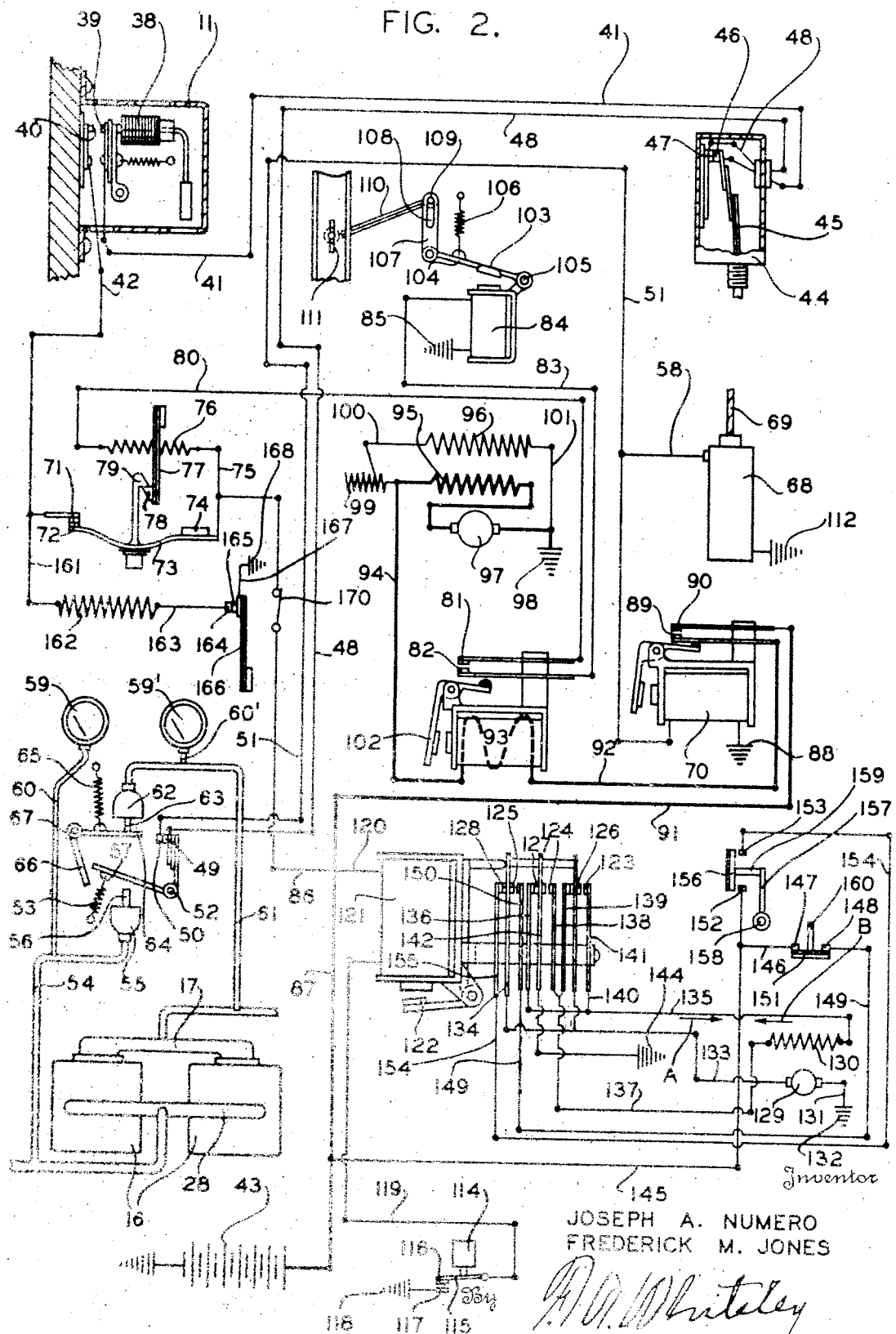
Fig. 2 is a schematic wiring diagram showing the relation of the different electrically operated instrumentalities and the circuits connected therewith.

Referring to Fig. 1 wherein the invention is shown applied to means for air-conditioning a compartment, the compartment is indicated at 10 and has therein a thermostat indicated at 11, the wiring from which is shown in Fig. 2. A heat exchanger evaporator 12 is connected by duct 13 with the compartment 10, and another duct 14 leads from the compartment 10 to a blower 15 which connects with ducts not shown for driving air through the evaporator heat exchanger 12, the course of the air being indicated generally by arrows 13' and 14'. This arrangement is, as shown in the aforesaid application, one adapted to be applied to the compartment of a moving vehicle such as a truck, and operates to force air which goes through the evaporator heat exchanger 12, and thus is cooled, into the compartment and to draw the air from the compartment through passage 14 and thus produce a continual circuit of air within the compartment until it has been brought to a desired temperature. The evaporator heat exchanger when used for cooling is furnished compressed gases from a compressor 16. The travel of this compressed gas normally will be as follows: From compressor manifold 17 the gas passes through pipe 18 and reversing valve 19 and pipe 20 to condenser 21. From condenser 21 the liquified gas goes through pipe 22 to compressed gas storage tank 23. From the compressed gas storage tank 23 the gas goes through pipe 24 to header 25 (shown in dotted lines) for distributing the gas to the coils of the evaporator heat exchanger, not shown. From the evaporator heat exchanger the expanded gas returns through pipe 26 and valve 14, thence through pipe 27 to compressor header 28, where it again continues the above cycle of distribution. A blower 28 is adapted to force air through the condenser 21 and thereby remove heat from the compressed gas in the condenser. The above mentioned moving parts get their power for operation from a gas engine 29. The drive shaft 30 of gas engine 29 is connected by belting 31 to drive the compressor 16, by belting 32 to drive the blower 28, and, through an extension 33 of said shaft, by belting 34 to drive the blower 15. The gas tank 35 furnishes the gas engine with necessary fuel through pipe 36. A starter generator indicated at 37 has its armature, not shown except in the wiring diagram of Fig. 2, fast on shaft 30. This starter generator by means of the circuits and arrangement of units, shown in Fig. 2, is adapted to automatically start the gas engine and to generate electricity for the battery when the condition to be controlled, in this instance the temperature condition within the chamber 10, goes above (or below) a predetermined maximum or minimum.

It will be understood that the valve indicated diagrammatically at 19 provides means, not shown, for reversing the flow of the liquid so that the hot liquid will go to the evaporator heat exchanger 12, which thus becomes a heater instead of a cooling device, and the expansion of the liquid will take place in the condenser 21. This reversal of flow applies to the present invention only to the extent that, where the reversal of flow takes place and the heat exchanger 12 becomes a heating device, the stopping and starting of the gas engine would still be controlled by the condition of the atmosphere in compartment 10 as affecting the thermostat 11.

The above defined arrangement of instrumentalities are, as stated, thus applicable to the air-conditioning (by cooling or heating, or both) of a compartment, particularly a movable compartment of a transport vehicle such as a truck. And while the arrangement of circuits, relays, switches and the like, given in detail in Fig. 2, is here shown subject to control by a temperature condition of the air of a compartment, it will be obvious that it may be employed subject to control from other changeable conditions.

Considering now the wiring diagram as illustrated in Fig. 2, the thermostat indicated generally as 11 may comprise an expansion member 38 with a movable contact 39 adapted to engage a fixed contact 40. The contact 39 is connected with a wire 41, and the contact 40 is connected with a wire 42. When the temperature within the compartment 10 is such as to call for change (either more heat or less heat whichever condition is required) the instrumentalities operated by the gas engine 29 will be required to be operated, and, therefore, the gas engine itself will be operating. When the required condition has been met the contacts 39 and 40 will separate and the operation of the gas engine will terminate. That is, the closing of the circuit through the wires 41 and 42 will put the different circuits, relays and the like in condition to cause the starter generator to start the gas engine and maintain it in operation until the condition has changed to a point where the circuit is broken at contacts 39, 40, when the gas engine will stop running and operations will cease. Thus, the closing of contacts 39 and 40 will establish a circuit from battery 43 to starter generator 37, whereby the starter and other instrumentalities will be operated to start the gas engine, which will then under normal conditions continue to run until the circuit is broken at 39, 40 by a change of the condition to be controlled. The circuit by means of which this is effective will now be traced.

Wire 41 goes to a contact member 46 carried by a thermostatic arm 45 in a box 44. The contact member 46 is normally in contact with a contact member 47 which is connected with a wire 48. If for any reason the engine heats unduly, thermostatic member 45 will move to break the contact between members 46 and 47 and the motor 37 will thereby be stopped. Wire 48 goes to a movable contact member 49 which engages a contact 50 connected with a wire 51. The movable contact piece 49 is pivoted at 52 and is held in contact with member 50 by a spring 53. A pressure tube 54 runs from the hot fluid manifold 28 of compressor 16 to a pressure responsive device 55 which has a plunger 56 adapted to engage an arm 57 fast with the movable contact arm 49. Normally contacts 49 and 50 will engage to complete the circuit from wire 51 to wire 48. When, however, the pressure in the compressor system rises to approach the danger point the plunger 56 will engage the arm 57 and cause breaking of contact between contact members 49 and 50, thus causing the gas engine to stop and, in turn, stopping operation of the compressor. Gages 59, 59' are connected by branch pipes 60 and 60' with the pressure tubes 54 and 61 and indicate to the operator the pressure at which the compressor is working. A low pressure tube 61 leads from the low pressure manifold 17 of compressor 16 to a pressure resistance device 62. This embodies a plunger 63 against which an arm 64 is held by means of a spring 65. An arm 66 is movable with arm 64 about a point of pivoting 67, and when the pressure within the system drops to indicate blocking from freezing the plunger 63 will be retracted by the spring 65, which will rock arms 64 and 66 to bring arm 66 against arm 57 and also break the contact between members 49 and 50. The wire 51 is connected through branch wire 58 with a high tension coil 68 which is connected in a usual manner through cable 69 with the distributor and ignition system of the gas engine, not shown. The wire 51 is also connected with the windings of a relay 70 which is referred to herein as the master relay and which will be described as to detail and use hereinafter.

Continuing to trace the circuits through, with the intervening safety devices, the wire 42 normally extends to a contact 71 adapted to engage a contact 72 on a spring-held double contact arm 73 secured to frame piece 74 and connected to a wire 75. The wire 75 passes through a resistance winding 76 which engages a thermostat piece 77. A hook 78 on thermostat piece 77 engages a hook 79 on double contact arm 73. This resistance winding 76 is in a branch circuit including a wire 80 which runs to a contact member 81 adapted to engage another contact member 82 connected by a wire 83 with a relay 84 and from the relay 84 with a ground 85. The purpose of this arrangement has to do with operation of a choke, which will later be described. The object of the thermostatic member 77 and heat resistance 76 is to throw the system out of operation when current continues for too long a period to pass through the circuit including the wires 80 and 83 and the relay 84.

With all of these instrumentalities in their normal closed position and the thermostat contacts 39 and 40 brought to closing position because heat exchange operation is called for, a branch wire 86 from the main battery wire 87 will carry battery current through wire 87, bridge piece 73 past contacts 71, 72 through wire 42, past contacts 39, 40 through wire 41, past contacts 46 and 47 through wire 48, past contacts 49, 50 through wire 51 to master relay 70 and finally to ground 88, thus energizing master relay 70 and closing contacts 89, 90. This causes heavy battery current to pass through branch wire 91 connected with main battery wire 87 and through wire 92, relay 93 and wire 94 therefrom, through the field coils 95 of the starter motor armature 97 and to ground 98. At the same time current will pass through a rheostat 99 and wire 100, through generator field coils 96 and thence through wire 101 to the armature 97, thereby caused to generate current going to battery 43.

There are but few windings on relay 93. These windings carry the heavy battery current from wires 91, 92 going to the starter generator and likewise carry the weak generator current going back through wires 94, 92, 91 and 87 to the battery. The few windings of relay 93 when carrying the heavy battery current will energize the relay to the point of operating the armature 102 thereof. But when the weaker generator current passes through relay 93 the few windings will not produce an energizing of relay 93 so that it is sufficiently energized to move armature 102 and close circuits 81 and 82 only when heavy battery starter current is going to the field coils 95.

This is an important feature of our invention since the certain automatic starting of a gas engine requires choke operation, and at the same time calls for instant termination of choke operation when the motor is started. As heretofore pointed out, closing of circuit through contacts 81 and 82 causes current to flow through relay 84 to ground 85. This pulls down the armature 103 on arm 104 pivoted at 105 and normally held up by spring 106. A link 107 having an elongated slot 108 connects with a pin 109 on arm 110 which operates choke 111. The arm 110 is a bimetallic thermostatic arm, so that when the engine is hot, and there is no need of choking action on starting the engine, the thermostatic action of arm 110 will move pin 109 down slot 108 so that when relay 84 is energized for starting the motor it will not have any effect on choke valve 111.

As above pointed out, battery current goes from branch wire 58 through high tension coil 68 and distributor cable 69 to the ignition system of the gas engine, and this circuit will remain closed for operation of the gas engine until broken by the action of the thermostat separating contacts 39 and 40 or by the action of any of the safety devices above described. The current going to the high tension coil 68 passes to the ground 112.

There are other conditions to be controlled adapted to operate through instrumentalities powered by a gas engine, as, for example, a condition dependent upon air pressure in the apparatus of the aforesaid application. When air is drawn in by the blower 15 through the coils of the heat exchanger 12, as indicated by the arrow 13, the space 113, see upper left of Fig. 1, will be subject to negative air pressure which will be increased when the spaces between the coils of the evaporator heat exchanger are clogged with frost. In that arrangement the valve 19 is operated through an electrical hookup with a device in said space 113 so as to reverse the flow of refrigerant and heat the coils and cause the frost and ice thereon to be melted. This is accomplished by means of an aneroid 114 which controls a contact piece 115 closing contacts 116, 117, which closes a circuit to ground 118 from wire 119. Expansion of the aneroid 114 through decrease in air pressure surrounding it causes contacts 116 and 117 to engage, permitting battery current to flow through a branch wire 120, relay 121 and wire 119 to ground 118. This pulls up the armature 122 which simultaneously closes a set of contacts 123, 124 and 125 and at the same time will open contacts 126, 127 and 128. A motor comprises armature 129 and field coils 130. A wire 131 goes from ground 132 through armature 129 and wire 133 to contact bar 134 by which contacts 125 and 128 are circuited. Another wire 135 goes from field coil 130 to bar 136 circuiting contact 127, and a wire 137 goes from the other end of field coil 130 to contact bars 138 and 139, circuiting respectively contacts 124 and 126. A branch wire 140 goes from wire 135 to contact bar 141 circuiting contact 123, and a wire from contact bar 142 between contacts 124 and 127 goes to ground 144. Branch wire 145 leads from battery wire 87 and connects with another wire 146 having thereon a contact 147. Another contact 148 is connected with wire 149 which goes to contact bar 150. A bridge piece 151 is adapted to close the circuit through contacts 147, 148, as shown in the lower right-hand portion of Fig. 2. The wire 145 also has thereon a contact piece 152. Another contact piece 153 is connected with a wire 154 which goes to contact bar 155. The gap between contacts 152 and 153 is adapted to be closed by a bridge piece 156.

The motor 129, 130 is a standard reversing motor having the above described two sets of current wires 131, 133 and 135, 137. When by the means above described the current is caused to travel in the direction of the arrow $a$ the motor will turn in one direction, and when the battery current is caused to travel in the direction of arrow $b$ the motor will be reversed and turned in the opposite direction. An arm 157 on a shaft 158 driven by the motor is adapted in one position to contact a finger 159 on bridge piece 156 to break the circuit between contacts 152 and 153, as shown, and stop operation of the motor 129, 130 when it has turned the shaft 158 through an arc of 90 degrees. The arm 157 is likewise adapted to engage a finger 160 on the bridge piece 151 so when the current is reversed by energizing the relay 121 a circuit is reestablished between contacts 152 and 153 and at the end of a 90° revolution of shaft 158 the bridge piece 151 will be moved to break the circuit between contacts 147 and 148. As above pointed out the energization of relay 121 takes place when the pressure condition changes so that aneroid 114 causes contacts 116 and 117 to engage. When the condition, as increase of air pressure, changes so that the aneroid causes a breaking of the circuit at contacts 116 and 117, the armature 122 will be released and the parts restored to the initial position, which will reverse the current, permitting another quarter turn in the opposite direction of shaft 158. The shaft 158 has connection, by means not shown, with reversing valve 19, which is typical of any member operating to control the instrumentalities for bringing about a change for stabilizing of the condition to be controlled.

Another type of control may be effected by humidification. As shown in the center left-hand part of Fig. 2, a branch wire 161 leads to a heater indicated at 162 which may be placed in contact with a body of water for throwing off moisture to increase humidity whenever the heater is in operation. A wire 163 goes from the heater 162 to a contact 164. Another contact 165 is fast on a humidostat 166 of well-known construction. The humidostat 166 is connected by wire 167 with a ground 168. When, therefore, deficiency of moisture causes the humidostat to close the circuit through contacts 164 and 165 the heater will be put into circuit and will vaporize moisture to be thrown into the air to increase its humidification. When the humidification reaches the desired predetermined degree the humidostat will break the circuit between contacts 164 and 165 and terminate further condition of moisture to the air in the compartment, it being noted that the humidostat 166 is positioned on a wall of the compartment, as indicated diagrammatically in Fig. 2.

A manual switch indicated at 170 may throw the entire system out of operation in a customary way.

In general the operation of the various instrumentalities has been quite fully given in connection with their detailed description. An example of the use of the invention is illustrated in Figure 1, where certain instrumentalities are shown so related as to cause a current of air to move into and move out of a compartment and be tempered on the way, that is, either cooled or heated in conjunction with heat transference means including a compressor and a condenser. The power operated means, compressor and blowers, essential to control the condition (temperature) in the compartment are all operated by a gas engine and, because that operation necessarily has to be intermittent the substance of this invention is applied through the starter-generator to effect automatic starting and stopping of the gas engine as the condition (temperature) in the compartment may require.

The primary advantage of the invention is that the arrangement of circuits and relays in relation to the starter-generator and the choke of the gas engine is such as to produce certain quick starting to be followed by immediate throwing out of the starting mechanism and action of the generator.

We claim:

1. Means for automatically starting and stopping a gas engine in response to changes of conditions to be controlled, comprising a starter motor adapted to act as a generator, a battery for operating the starter motor and for receiving current generated by the generator, a master relay for closing the circuit between the battery and the starter generator motor, a secondary circuit connected with the battery and with the ignition system of the gas engine and with the master relay for energizing the master relay and providing ignition current to the gas engine, and a member in said secondary circuit operated by external changes, as of temperature, pressure and the like adapted to close and break the secondary circuit in response to such changes of a predetermined amount, said secondary circuit remaining closed and active to hold the master relay operative until the member breaks the secondary circuit, the circuit through the master relay contacts carrying battery current for starting the gas engine and thereafter carrying generated current to the battery for charging the same.

2. In means for controlling changeable conditions within a closed chamber such as temperature, pressure and the like, including a gas engine for operating the same, means for automatically starting and stopping the gas engine in response to changes of condition within such chamber, comprising a starter motor adapted to act as a generator, a battery for operating the starter motor and for receiving current generated by the generator, a master relay for closing the circuit between the battery and the starter generator motor, a secondary circuit connected with the battery and with the ignition system of the gas engine and with the master relay for energizing the master relay and providing ignition current to the gas engine, a member in said secondary circuit operated by such changes of condition external thereto adapted to close and break the same in response to such changes of a predetermined amount, said secondary circuit remaining closed and active to hold the master relay operative until the change-responsive member breaks the secondary circuit, the circuit closed by the master relay carrying battery current for starting the gas engine and thereafter carrying generated current to the battery for charging the same.

3. Means for starting and stopping a gas engine in response to changes in a condition to be controlled, such as temperature, pressure and the like, comprising a starter motor adapted to act as a generator, a battery for operating the starter motor and for receiving current generated by the generator, a high current circuit from the battery to the starting generator including contacts of a master relay and a second high current relay, said second relay having few windings so that only high current will energize it, a choke and means for operating it including a circuit from said second relay active only when said second relay is energized, a secondary circuit connected with the battery and the ignition system of the gas engine and with one of said relays, a member for said secondary circuit operated by such changes of condition external thereto adapted to close and break the secondary circuit in response to such temperature changes of predetermined amount, said secondary circuit remaining closed and active to hold the master relay operative until the member breaks the secondary circuit, the circuit closed by the master relay and through the second named relay carrying high battery current for starting the gas engine and energizing the second named relay to cause operation of the choke, and thereafter carrying weaker generated current to the battery for charging the same while resulting in deenergizing of the second named relay.

4. In means for controlling temperature within a compartment, including a compressor and air-moving means, and a gas engine for operating the same, a starter generator, a battery and a circuit therefrom to the starter-generator including a circuit-breaking switch, a master relay for closing said switch when the master relay is energized, a battery circuit running to the master relay and to the distributor for the ignition system of the gas engine, a switch in said last-named circuit, and a thermostat in said compartment responsive to the temperature condition therein to be controlled by means operated by the gas engine for operating said switch to make or break the last-named circuit, whereby battery current will be caused to go through closed contacts of the first-named switch to the starter-generator and generator current will pass through said same closed switch to the battery after the gas engine has been started.

5. In means for starting and stopping a gas engine, a starter-generator, a battery and a circuit therefrom to the starter-generator including a circuit-breaking switch, a master relay for closing said switch when the master relay is energized, a battery circuit energizing said master relay including a switch, a member responsive to external conditions to be controlled by the operation of the gas engine such as temperature for operating said switch to make or break the last-named circuit, heat responsive members in said last-named circuit for breaking the circuit when excessive heat takes place, said last circuit remaining closed and the master relay energized until the last-named circuit is broken by operation of its switch by the members responsive to the condition to be controlled, whereby the battery current will be caused to go through the closed contacts of the first-named switch and weaker generator current after the gas engine has been started will pass through the closed switch of the master relay to the battery.

6. In means for starting and stopping a gas engine, a starter-generator, a choke, a battery and a circuit therefrom to the starter-generator including a circuit-breaking switch, a choke circuit, a choke circuit relay in said battery circuit having but few windings, a master relay for closing said switch when the master relay is energized, a battery circuit for energizing said master relay including a switch, a member responsive to conditions to be controlled through operation of the gas engine for operating said switch to make or break the last-named circuit, and a relay in said choke circuit for operating the choke, whereby battery current will be caused to go through the closed contacts of the master switch and through the few windings of the choke circuit relay and thereby energize the same and after the gas engine has been started weaker generator current will pass through said few windings and said closed switch to the battery, said generator current being too weak to energize the choke circuit relay so the choke relay will be deenergized and the choke be put out of commission.

JOSEPH A. NUMERO.
FREDERICK M. JONES.